April 17, 1962 R. S. EVANS 3,029,960
ADJUSTABLE BOAT TRAILER
Filed Oct. 16, 1958 4 Sheets-Sheet 3

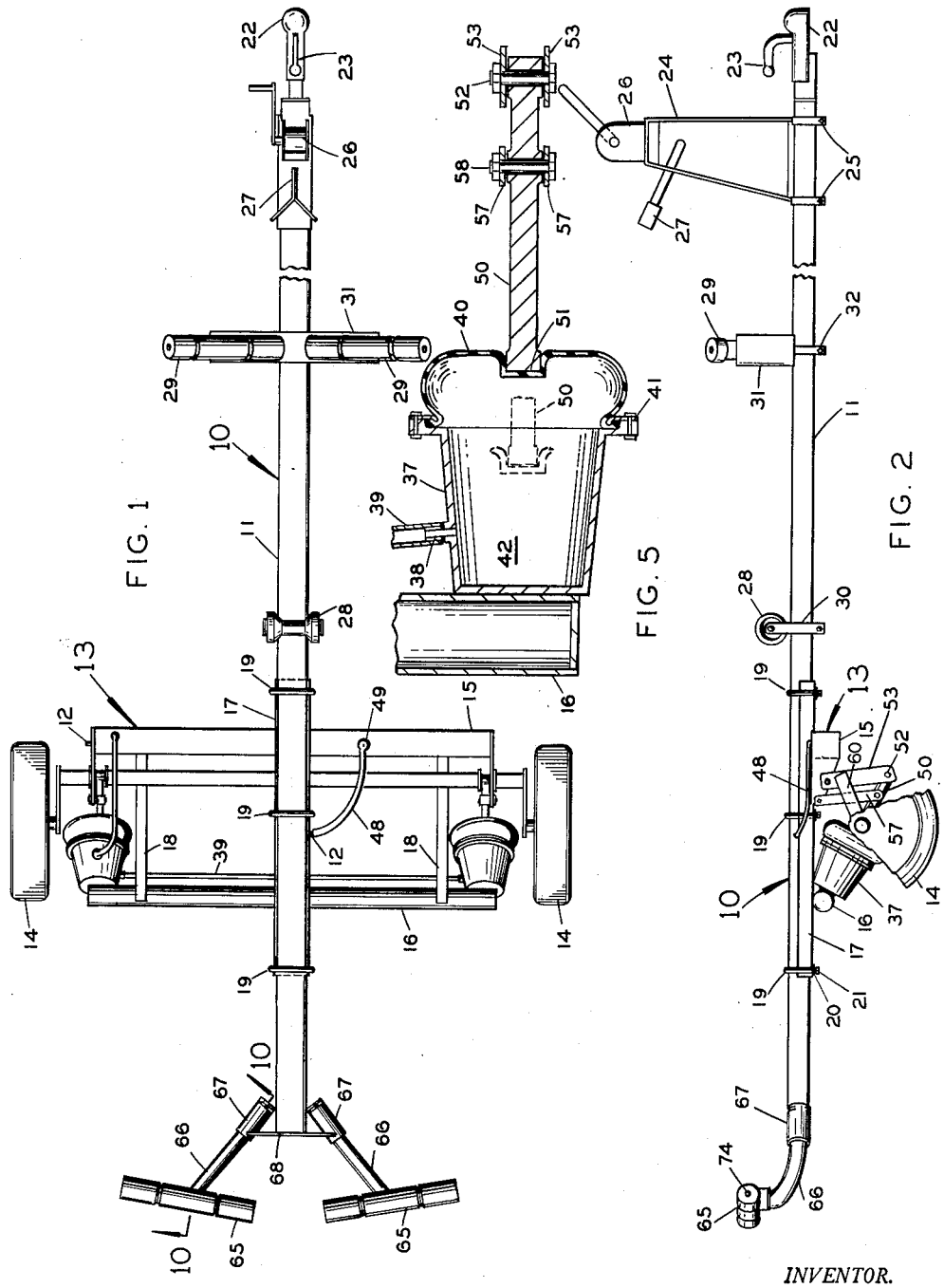

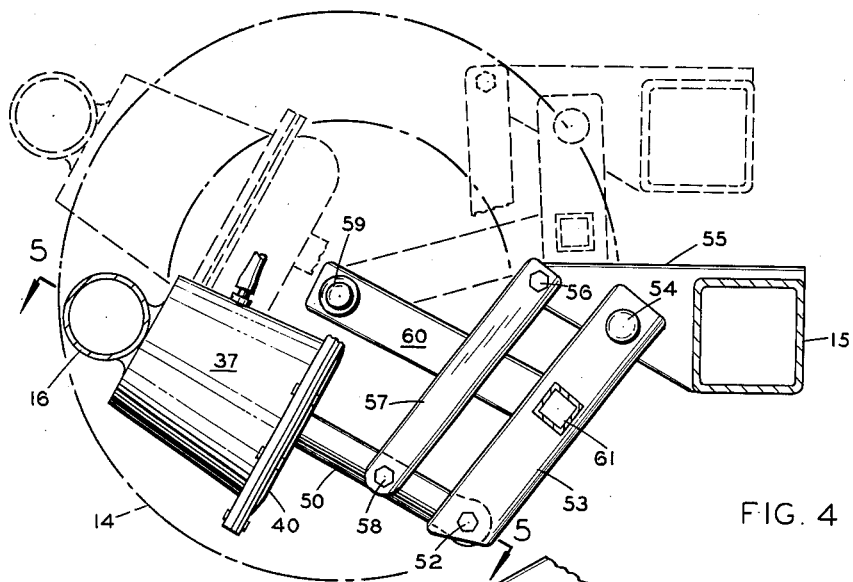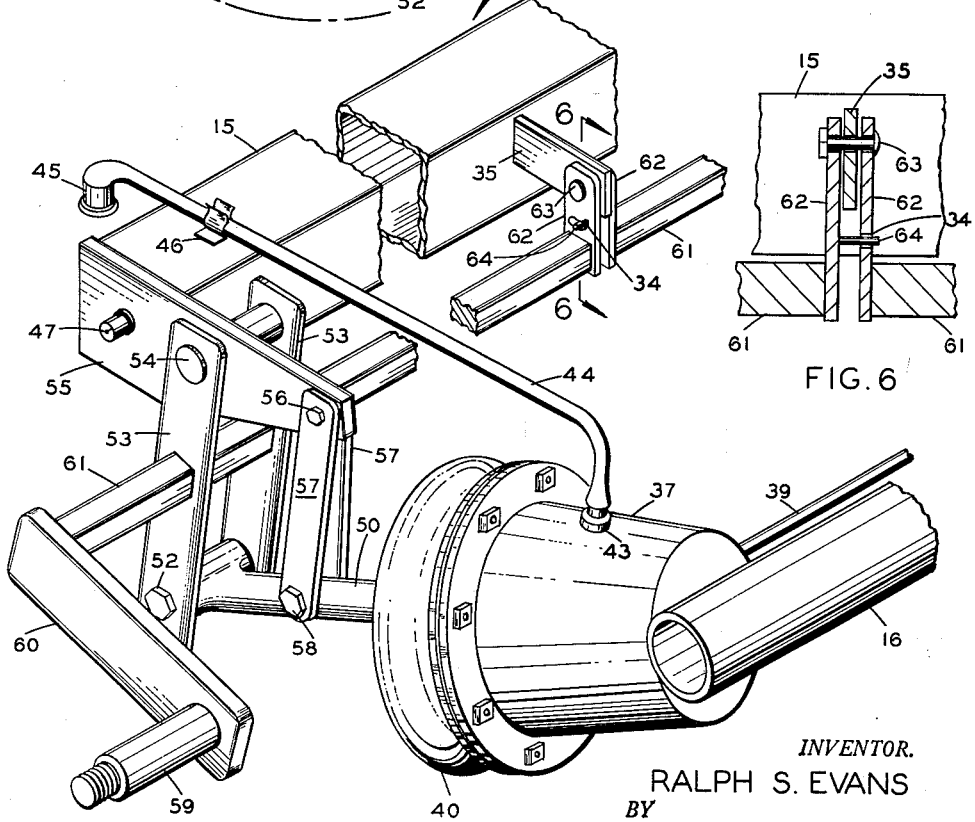

INVENTOR.
RALPH S. EVANS
BY
ATTORNEY

April 17, 1962
R. S. EVANS
3,029,960
ADJUSTABLE BOAT TRAILER
Filed Oct. 16, 1958
4 Sheets-Sheet 4
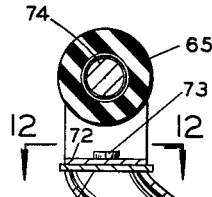
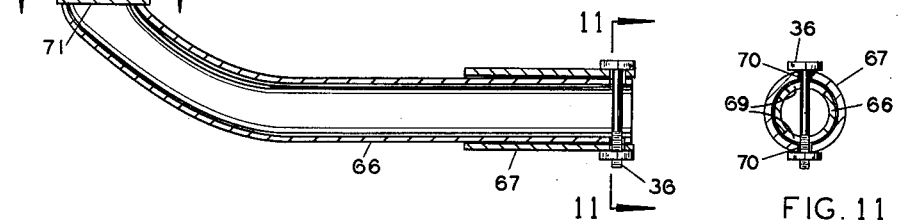
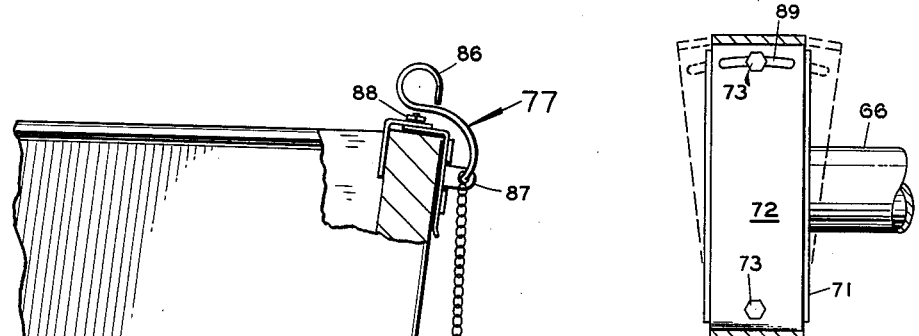
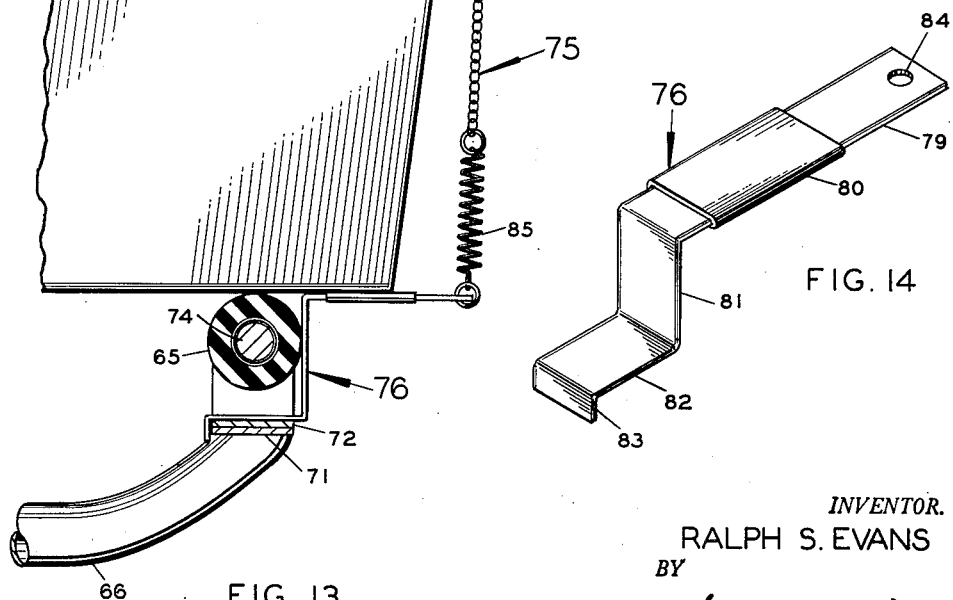
INVENTOR.
RALPH S. EVANS
BY
*Salvatore G. Militana*
ATTORNEY

United States Patent Office 3,029,960
Patented Apr. 17, 1962

3,029,960
ADJUSTABLE BOAT TRAILER
Ralph S. Evans, 730 NE. 90th St., Miami, Fla.
Filed Oct. 16, 1958, Ser. No. 767,643
4 Claims. (Cl. 214—84)

This invention relates to trailer structures and is more particularly directed to boat trailers having a frame which may be raised and lowered.

A principal object of the present invention is to provide a boat trailer for the accommodation of the larger sized boats, which boats can be launched or retrieved by a single person attending the trailer with ease and without danger of damaging the boat notwithstanding the condition of wind and sea.

Another object of the present invention is to provide a boat trailer with an adjustable under carriage to permit moving the carriage along the main frame of the trailer and securing it at a desired position thereon so that center of gravity of the boat will be properly positioned on the trailer.

A further object of the present invention is to provide a boat trailer with an air spring and linkage system which is readily actuable for dropping the trailer frame for readily launching or retrieving a boat thereon.

A further object of the present invention is to provide a boat trailer with a frame structure capable of storing air under pressure for actuating an air spring and linkage system in raising the trailer frame.

A further object of the present invention is to provide a self-centering roller system which automatically centers a boat as it rolls along the rollers when housing a boat on the trailer.

A still further object of the present invention is to provide a boat trailer with a pair of rollers which engage the hull of the boat along their full length as the boat slides on the rollers with the rollers changing their angular position as the curvature of the hull of the boat changes from one end to the other.

A still further object of the present invention is to provide a quick release strap assembly for securing a boat on a trailer.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a top plan view of a boat trailer constructed in accordance with my invention.

FIGURE 2 is a side elevational view shown with a wheel partially broken away.

FIGURE 3 is a fragmentary perspective view of the raising and lowering mechanism with the wheel removed of the trailer.

FIGURE 4 is a side view of the raising and lowering mechanism with the broken lines indicating the raised position of the trailer.

FIGURE 5 is a detailed cross sectional view taken along the line 5—5 of FIGURE 4.

FIGURE 6 is a detailed cross sectional view taken along the line 6—6 of FIGURE 3.

Figure 7:
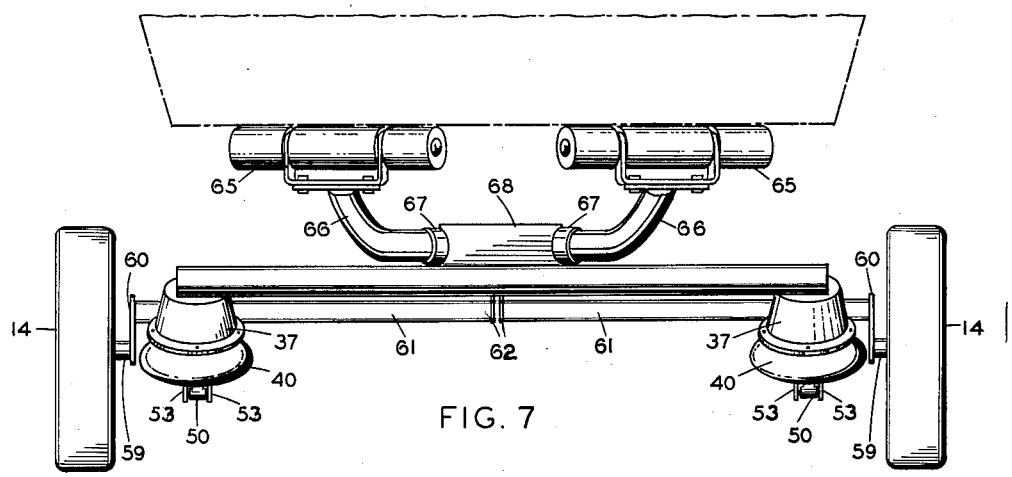
Figure 8:
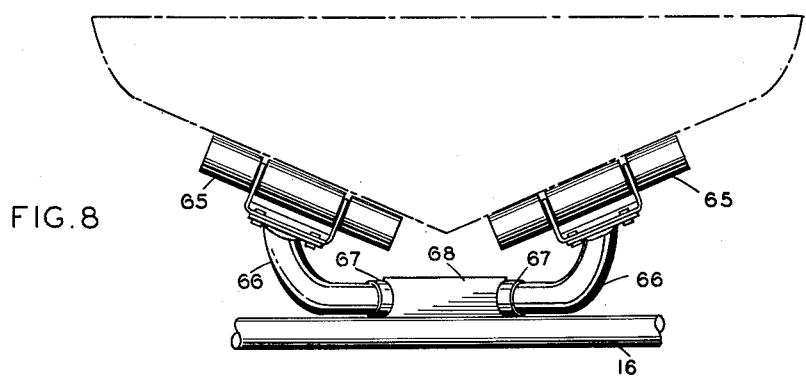
Figure 9:
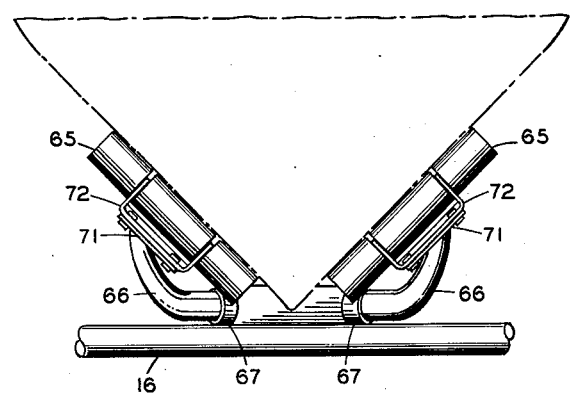

FIGURES 7 to 9 inclusive are rear elevational views showing a boat in dotted lines with the different positions its rear boat centering rollers assume as the boat is being rolled off or on the trailer.

FIGURE 10 is a cross sectional view taken along the line 10—10 of FIGURE 1.

FIGURES 11 and 12 are cross sectional views taken along the lines 11—11 and 12—12 respectively of FIGURE 10.

FIGURE 13 is a vertical sectional view taken through its rear roller showing a device for securing a boat to the trailer.

FIGURE 14 is a perspective view of a roller engaging arm of the boat fastening device.

Referring to the drawings wherein like numerals are used to designate similar parts throughout the several views, the numeral 10 refers to my adjustable boat trailer consisting of a longitudinally disposed main frame member 11 which is hollow and serves as a tank for air under pressure with a duct 12 positioned along a side wall of the member 11 for the intake and discharge of air under pressure as explained in detail hereinafter.

Adjustably mounted on the main frame member 11 is a carriage 13 for supporting the frame member 11 above the ground on wheels 14 to permit the towing of the trailer 10. The carriage 13 is provided with cross members 15 and 16 secured together in spaced parallel relation by a channel member 17 at their mid-portion and tie bars 18, 18 positioned on either side of the channel member 17. The channel member 17 which is U-shaped in cross sections forms a saddle for receiving the main frame member 11 and adjustably secured to the latter by U-bolts 19 having leg portions extending through bores in a plate member 20 with nuts 21 threaded and tightened on the U-bolts 19. It can be seen that this construction of the saddle 17 and fasteners 19, 20, 21 permits one to readily adjust the position of the carriage 13 on the main frame member 11. This is important for the reason that the wheels 14 should support the boat being carried by the trailer 10 at a short distance to the rear of the center of gravity of the combination of the boat and the trailer so that the trailer 10 is slightly heavy (unbalanced) at its front end hitched as at 22 to a motor vehicle. The hitch 22 secured to the extreme forward end of the main frame 11 is a conventional tow hitch provided with a locking lever 23. Alongside the hitch 22 there is adjustably mounted on the main frame 11 an upright winch stand 24 secured thereon by clamps 25 bolted to the main frame 11. A hand operated winch 26 is mounted on the winch stand 24 along with a bow cradle 27 extending rearwardly along the longitudinal axis of the trailer 10.

Mounted on the main frame 11 are two sets of rollers 28 and 29. Roller 28 is a keel receiving roller bolted to the main frame 11 forwardly of the carriage 13 by an adjustable clamp 30, while rollers 29 form a bank on each side of the longitudinal axis of the main frame 11 which rollers 29 engage the hull of the boat when supporting the boat. The rollers 29 are supported by an upwardly extending bracket 31 bolted to the main frame 11 as at 32.

Means are provided on the carriage 13 for pneumatically raising and lowering the trailer 10 to facilitate the launching and housing a boat on the trailer 10 comprising an air spring pot 37 welded or otherwise secured to each end of the cross beam 16. The pots 37 are provided with a duct 38 which are connected together by a conduit 39 to permit air under pressure to flow from one air spring pot 37 to the other; each of the pots 37 have their open ends enclosed by a somewhat semi-spherically shaped flexible cover 40 whose ends are secured between the periphery of the pot 37 by a clamping ring or disk 41 by bolts as shown. An enclosed chamber 42 is formed whereby when air under pressure is piped into the chamber 42, the flexible cover 40 assumes the position shown by FIGURE 5 and when the air is vented from the chamber 42, the cover 40 assumes the position shown by dotted lines.

One of the air spring pots 37 is provided with a duct 43 to which one end of an air hose 44 is connected to the other end having a valve 45 for controlling the intake and outlet of air under pressure in the air springs 37. The air hose 44 is normally held by a spring clamp 46 mounted on the cross member 15 and is removed therefrom when it is desired to inflate the air springs 37. When the valved portion 45 of the air hose 44 is placed at a valved duct 47 which communicates with air under pressure stored in the hollow cross member 15 that in turn is connected to the hollow main frame member 11 by a hose 48 connecting the duct 12 at one end and a duct 49 at the other end.

Moving in unison with each of the flexible covers 40 for raising and lowering the trailer 10 is a piston arm 50 which has one end fitted into a cavity 51 at the center of the flexible cover 40 and the other end pivoted as at 52 to the lower ends of a pair of links 53. The upper ends of the links 53 are pivoted by a pin 54 extending through a bore in a bracket arm 55 whsoe other is welded to the ends of the cross member 15. At the extreme end of the arm 55 is a second pivot pin 56 to which the upper ends of guide links 57 are secured while the lower ends are pivotally secured as at 58. The guide links 57 swing in parallel relation with the main links 53 and serve to maintain the piston arm 50 in alignment with the central axis of the air spring pots 37.

The wheels 14 are rotatably mounted on stub axles 59 whose inner ends are welded or otherwise secured to one end of arms 60, whose other ends are secured to the outer ends of shafts 61. Shafts 61 which are rectangular in cross section extend through bores in the links 53 to thereby swing in unison therewith and extend to the longitudinal axis of the trailer 10 where the inner ends of the shafts 61 are welded to one end of arms 62. The upper ends of the arms 62 are pivoted by a pivot pin 63 secured to a bracket member 35 extending from the cross member 15. The pivot pin 63 is in axial alignment with the pivot pins 54. In order to insure the simultaneous swinging movement of the links 53 so that both sides of the trailer 10 at the wheels 14 will rise and descend at the same time to prevent the tipping of the trailer, one of the arms 62 is provided with a pin 64 which extends through a slightly elongated bore 34 in the other of the arms 62.

It is readily understood that upon the inflation of the air springs 37 by removing the air hose 44 from the spring clip 46 and placing the valve 45 in contact with the valved duct 47 air under pressure which is contained in the cross member 15 and main frame member 11 will enter into the air spring 37 and inflate same causing the flexible cover 40 to assume its outwardly extended position. The piston arm 50 is caused to slide outwardly carrying the lower end of the links 53 which pivot about the pivot pins 54. The shafts 61 likewise swing with the links 53 carrying the arms 60 and wheels 14. With the wheels 14 resting on the ground so that the axles 59 are prevented from swinging downwardly then the arms 60 must swing upwardly to the dotted line position as shown by FIGURE 4, carrying the links 53 and the cross member 15 as well as the cross member 10 thereby causing the trailer 10 to become raised.

To lower the trailer 10, the reverse operation is effected by releasing the valve 45 to allow air in the air springs 37 to escape. The flexible cover 40 collapses and enters the air chamber 42 carrying the piston arm 50. As the piston arm 50 slides in the direction of the air spring 37, the lower ends of the links 53 swing likewise carrying the arms 60 and axles 59. Since the wheels 14 are resting on the ground, the wheels 14 remain immobile and the arms 60 will swing shifting the links 53 from the dotted line to the solid line position thereby lowering the carriage 13 and the main frame member 11.

Means are provided on the extreme rear portion of the main frame member 11 to support the hull of a boat on both sides of a keel and permit the rolling of the boat thereon comprising the rollers 65. See FIGURES 7–11 inclusive. It can be seen that whatever the nature of the surface of the hull, the rollers 65, 65 contact the hull of the boat along their full lengths. This is accomplished by the rollers being adjustably mounted on arcuate arms 66 extending rearwardly and diagonally of the main frame member 11. The forward end of the arms 66 are received by a sleeve 67 which is welded to the main frame member 11 and reinforced by a cross member 68 which has its ends welded to the rear portion of the sleeves 67. The arm 66 is rotatably secured to the sleeve 67 by a bolt 36 extending through bores 69 and 70 in the arm 66 and sleeve 67 respectively. The bores 69 in the arm 66 are elongated to permit rotation of the arm 66 in the sleeve 67. At the free end of the arm 66 a plate support 71 is welded thereon with a similar plate member 72 secured thereon by bolts 73. The plate member 72 is provided with an elongated bore 89 for one of the bolts 73 to permit adjusting the rollers 65 as desired and hereinafter explained. The outer ends of the plate members 72 are upturned to form leg portions for supporting a shaft 74 on which the rollers 65 are rotatably mounted. It is noted that by positioning the shaft 74 of the rollers 65 at a slightly oblique angle with relation to the longitudinal axis as shown by FIGURE 1, the rollers 65 tend to center the boat on the trailer 10.

As best shown by FIGURE 9, with the trailer 10 in its lowered position as described hereinabove, a bow of a boat is placed between the pair of sets of rollers 65. Immediately, the rollers 65 will pivot about their arcuate arms 66 and position themselves in abutting relationship against the sides of the boat at the hull. Now, a line not shown is unwound from the hand winch 26 and secured to an appropriate line engaging hook on the boat and the winch 26 is then operated to pull the boat forwardly on the trailer 10. As the boat moves forwardly on the rollers 65, 65, the latter tend to force the keel of the boat and maintain it along the longitudinal axis of the trailer 10. At the same time, the rollers 65 are pivoting about their arms 66 in the sleeves 67 to maintain the rollers in complete contact relation with the hull of the boat, whose curvature is changing as the boat slides on the rollers 65 in a forward direction. When the boat has advanced sufficiently on the trailer 10, the keel roller 28 will receive the keel of the boat and will be supported by the rollers 29. When the boat is fully housed on the trailer 10, the prow of the boat will be received by the bow cradle 27 and the winch 26 is locked against turning.

The stern of the boat is then secured against movement by a strap assembly 75 which not only secures the boat but also relieves the rollers 65 of the dead weight of the boat while the boat is housed thereon. The strap assembly 75 consists of a strap 76, a quick release bracket 77 and a chain 78 connecting the two parts. The strap 76 is formed of an elongated strip of sheet metal having a main body portion 79 having a bore 84 and about which a rubber member 80 is positioned for engaging the bottom of a boat so as not to scratch or mar the finish on same. A roller engaging portion 81 extends downwardly at right angle to the main body portion with a plate engaging portion 82 extending horizontally at right angle to the lower end of the portion 82 and a short depending flanged portion 83 at right angle to the plate engaging portion 82. The hold down strap 76 is inserted between the rollers 65 and the base plates 72 and 71 placing the flange 83 in contact relation with the inner edges of the base plates 71, 72. The portion 82 now rests on the base plate 72, the portion 81 bears against the roller 65 and the rubber cover 80 bears against the bottom of the boat. A coil spring 85 has its lower end secured through the bore 84 of the strap 76 and the chain 78 connected to its upper end. The chain 78 is connected to the quick release bracket 77 which is positioned over the top edge of the transom of the boat. One link of the chain 78 extends through a handle 86 which is pivotally mounted on a lug 87 welded to the face of the bracket 77. The bracket 77 may be adjusted to fit on transoms of different widths by means of the nut 88. The strap assembly 75 is readily removed by swinging the handle 86 downwardly, then lifting the bracket 77 off the transom of the boat and then swinging the main body portion 79 downwardly until the flanged end 83 is disengaged from the edge of the plates 71, 72. The strap 76 is then removed and stored away until ready to be returned in position to secure the boat as shown by FIGURE 13.

What I claim as new is:

1. In a boat trailer having a longitudinally disposed main frame, roller support means mounted on a rear portion of said main frame, said roller support means comprising arm support members disposed on said main frame and extending rearwardly, an arm member rotatably mounted on each of said arm support members, said arm members terminating in an end portion disposed above an axis passing through said arm support members whereby upon rotational movement of said arm members, said end portions describe arcs in substantially vertically disposed planes and roller means mounted on said end portions of said arm members whereby upon the rotation of said arm members on said arm support members the mean distance between said roller means is varied.

2. In a boat trailer having a longitudinally disposed main frame, roller support means mounted on a rear portion of said main frame, said roller support means comprising arm support member symmetrically disposed on each side of said main frame and extending rearwardly at an oblique angle away from each other, an arm member rotatably mounted on each of said arm support members, said arm members terminating in an end portion disposed above an axis passing through said arm support members whereby upon rotational movement of said arm members said end portions describe arcs in substantially vertically disposed planes, and substantially elongated roller members mounted on said end portions of said arm members, said roller members extending substantially transversely to said main frame and having inner and outer end portions whereby upon the rotational movement of said arm support members, said elongated roller members swing in an arc varying the mean distance between said roller members.

3. In a boat trailer having a longitudinally disposed main frame, roller support means mounted on a rear portion of said main frame, said roller support means comprising a sleeve substantially symmetrically disposed on each side of said main frame and extending rearwardly in a direction away from each other, an arm member rotatably mounted in each of said sleeves, said arm members terminating in an end portion disposed above an axis passing through said sleeves whereby upon rotational movement of said arm members said end portions describe symmetrically disposed arcs in substantially vertically disposed planes, interengaging means mounted on each of said sleeves and said arm members for limiting the rotational movement of said arm members, a first support plate secured to said end portions of said arm members, further plate members, adjustable means mounting said further plate members on each of said first support plates, said further plate members having upwardly extending leg portions, a shaft supported by said leg portions and roller means having inner and outer end portions rotatably supported on said shafts whereby upon the rotational movement of said arm members in said sleeves in a direction toward each other, said roller means swing in an arc decreasing the mean distance between said roller means.

4. The structure as recited by claim 3 whereby upon actuation of said adjustable means said roller means are positioned at an oblique angle with said longitudinally disposed main frame with said inner ends thereof rearward of said outer ends.

References Cited in the file of this patent

UNITED STATES PATENTS

| 1,446,270 | Pfeiffer | Feb. 20, 1923 |
| 1,486,259 | Nelson | Mar. 11, 1924 |
| 1,495,442 | Rosencrans | May 27, 1924 |
| 1,577,725 | Jones | Mar. 23, 1926 |
| 1,633,153 | Wray | June 21, 1927 |
| 1,926,541 | Jennings | Sept. 12, 1933 |
| 2,636,745 | Cartwright | Apr. 28, 1953 |
| 2,681,811 | Green | June 22, 1954 |
| 2,787,476 | Holsclaw | Apr. 2, 1957 |
| 2,816,672 | Facchini | Dec. 17, 1957 |
| 2,840,252 | Weber | June 24, 1958 |
| 2,860,792 | Nelson et al. | Nov. 18, 1958 |
| 2,889,946 | Holsclaw | June 9, 1959 |
| 2,915,209 | Layne | Dec. 1, 1959 |